M. A. NICOL.
MEANS FOR LUBRICATING BEARING SURFACES.
APPLICATION FILED MAY 27, 1914.
1,140,056.
Patented May 18, 1915.
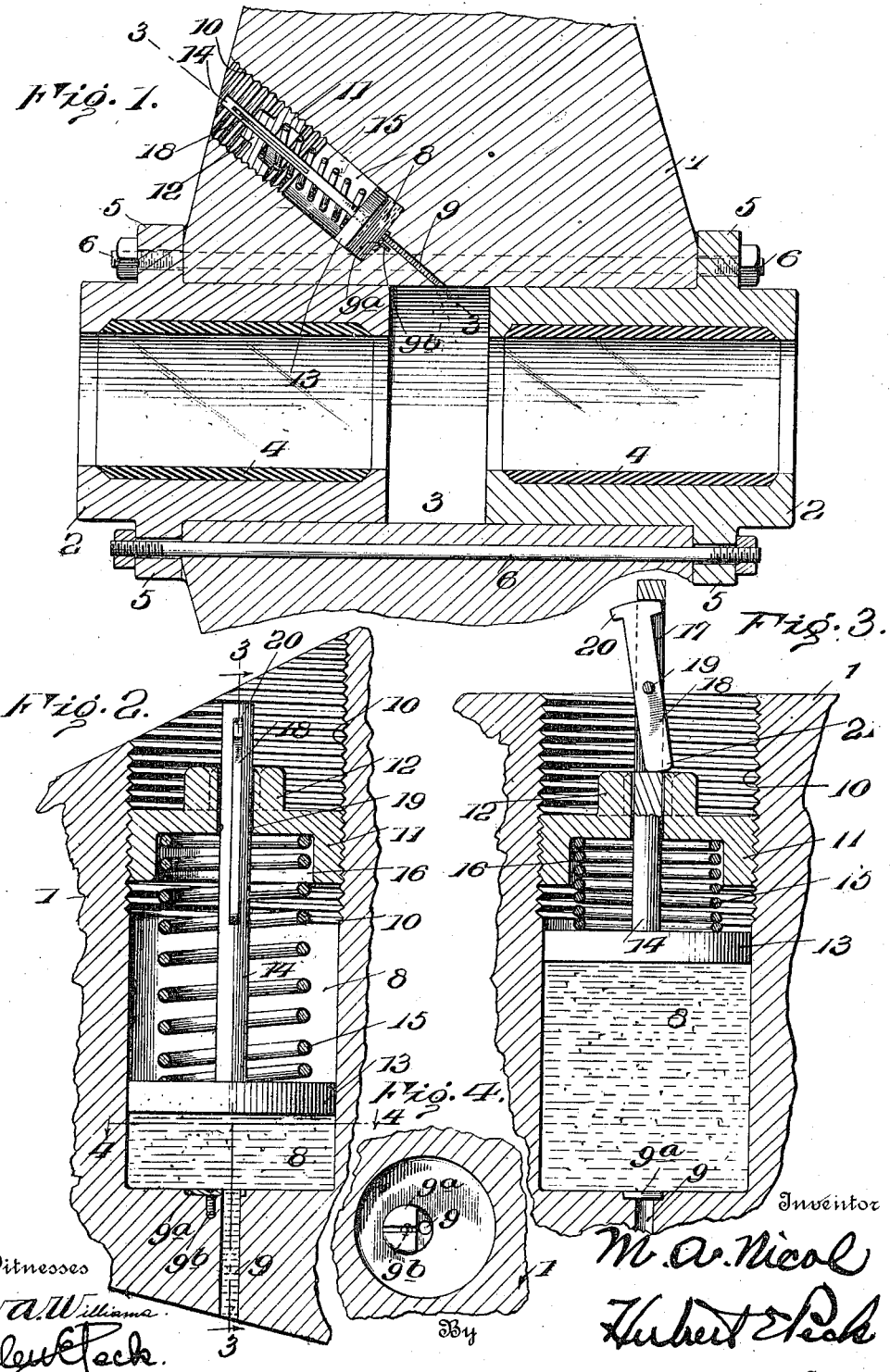

UNITED STATES PATENT OFFICE.

MARVIN A. NICOL, OF WILLAMINA, OREGON.

MEANS FOR LUBRICATING BEARING-SURFACES.

1,140,056.   Specification of Letters Patent.   Patented May 18, 1915.

Application filed May 27, 1914. Serial No. 841,303.

*To all whom it may concern:*

Be it known that I, MARVIN A. NICOL, a citizen of the United States, residing at Willamina, in the county of Yamhill and State of Oregon, have invented certain new and useful Improvements in Means for Lubricating Bearing-Surfaces, of which the following is a specification.

This invention relates to certain improvements in means for lubricating bearings; and the objects and nature of the invention will be readily understood by those skilled in the art in the light of the following explanation of the accompanying drawing illustrating what I now believe to be the preferred embodiment or mechanical expression of my invention from among other formations and constructions within the spirit and scope thereof.

The invention consists in certain novel features in construction and in combinations and arrangements as more fully and particularly set forth and specified hereinafter.

Referring to the accompanying drawings;—Figure 1, is a section through a portion of a rotary body embodying and provided with my invention. Fig. 2, is a detail section taken in the same plane as the section Fig. 1, and on a somewhat larger scale. Fig. 3, is a section on the line 3—3, Fig. 1, and Fig. 2 on an enlarged scale. Fig. 4, is a section on the line 4—4, Fig. 2.

In the drawings, I show the cast or other heavy solid metal body 1, of a large heavy wheel, roller or other usually large heavy movable body having a bearing face to be lubricated whether or not such body rotates or is otherwise movable, and whether or not the bearing face is part of a cylindrical bearing or bearing face of some other form. In the particular example illustrated, the rotary body 1, is formed with a central transverse bore concentric with the axis of rotation, and containing a pair of removable bearing bushings 2, inserted longitudinally thereinto from opposite ends thereof and usually almost meeting at their inner ends at the center of the length of the bore and by the space intervening between their said inner ends forming an annular lubricant space 3, adapted to surround the axle or other journal on which the body rotates. The inner faces of these bushings are recessed to receive anti-friction or bearing metal 4, to form the bearing surfaces of the bushings to be engaged by said axle or journal on which the wheel or other body is mounted. Said inner faces of the bushings are so formed that the said anti-friction or bearing metal can be readily renewed therein by casting or pouring when the bushings are removed from the body. The outer ends of the bushings project at the exterior of the wheel or other body and hence extend outwardly beyond the bore, and are provided with the exterior flanges 5, arranged adjacent to the outer end faces of the body and are formed with transverse perforations or bolt holes through which bolts 6, from the body 1, removably extend to receive nuts for clamping and securing the bushings in the bore of the body. Whenever the anti-friction metal bearings of the bushings become unduly worn, the bushings can be readily removed and said bearings can be readily renewed by pouring or otherwise and the bushings can then be readily re-inserted in the bore and secured. The bushings can thus be used indefinitely and the bearing surfaces thereof renewed from time to time, whereby a material saving is effected over those methods requiring new bushings when the bearings become unduly worn. I provide improved means for supplying the necessary lubricant to said annular space between the inner ends of the bushings and from which space the inner or bearing faces of the bushings are lubricated. For instance, the solid metal body is cast or otherwise formed with a lubricant chamber 8, at its outer end opening through a side or end face of the wheel body, while its inner end is closed except for a lubricant duct 9, forming an unobstructed passage from the inner end of said chamber to said space between the inner ends of the bushings. This duct forms a straight longitudinal continuation of the chamber 8, and at its outer end opens through the floor of the chamber while its inner end opens into the central portion of the bore through the body. The chamber 8, is preferably cylindrical and elongated, and the chamber and duct usually extend at an inclination from a side face of the body, at a point somewhat remote from the center bore, through the body to the central portion of the bore.

It is usually desirable to provide means for varying the capacity of the duct 8, and hence for regulating the flow of lubricant therethrough. In the particular example illustrated, I show means for this purpose, comprising a flat disk $9^a$, arranged on the floor of the lubricant chamber 8, adjacent the inlet end of the duct 9, and adapted to be adjusted to partially close said inlet end or completely open the same to the flow of lubricant. This disk 9ª, is confined to the floor of the chamber by an axis 9ᵇ, approximately parallel with the longitudinal axis of duct 9, and the disk eccentrically arranged with respect to said axis and is rotatable thereon to project a greater or lesser distance across the duct or to withdraw therefrom. The disk is shown formed with a top groove or slot to receive a screw driver or other implement whereby the disk can be rotated and thus adjusted. If so desired, the disk and its axis can be formed by a machine screw 9ᵇ, screwed into a tapped hole in the floor of the chamber 8, and having an enlarged flat mutilated or eccentric head 9ª.

The chamber is formed with an internal longitudinal screw thread 10, extending from its outer end inwardly for a suitable distance. This screw thread forms means for securing a suitable closure in the chamber and rendering the same longitudinally adjustable therein and removable therefrom. For instance, I show a screw threaded plug 11, for this purpose, at its outer end formed with a central projecting angular hub or boss 12, to receive a socket wrench or other means for rotating the plug in screwing the same into and removing the same from the chamber. This closure is provided with means for applying sufficient pressure to the lubricant within the chamber to forcibly feed the same through the duct and into the bore or bearing of the wheel or other body. In the particular example illustrated, this pressure applying means comprises a disk or piston 13, spanning the chamber 8, and movable longitudinally therein and fixed to and carried by a central longitudinal stem 14, projecting outwardly therefrom through the closure beyond which it extends for a suitable distance.

A coiled expansion spring 15, is arranged between the closure and disk and around the stem and is adapted to supply the power for driving the disk inwardly to compress the lubricant.

The inner end of the closure is preferably provided with a central cylindrical socket 16, in which the outer end of the spring is arranged and into which the spring can be compressed. The closure is provided with a central longitudinal hole or bore through which the stem passes and in which it is freely movable longitudinally. The stem is provided with means for holding the disk at its limit of outward movement toward the closure and the spring consequently compressed more or less tightly into the socket at the inner side of the closure, and whereby the stem can then be released to permit expansion of the spring. For this purpose, the stem is formed with a longitudinal slot 17, closed at its ends and at its outer end terminating near the outer end of the stem. In this slot, I arrange an elongated catch or detent 18, arranged longitudinally of the stem and arranged to swing transversely thereof on a pivot or axis 19, traversing the slot and extending transversely through the stem and detent about midway the length of the detent. The detent consists of a flat oblong metal plate whose width is approximately equal to the diameter of the stem or width of the slot, except that the upper end of the detent is formed with a T head 20, or a head projecting laterally in opposite directions beyond the stem. The arrangement of the detent with respect to the stem is such that when the detent is swung into the slot in position parallel with the stem, the stem is free to move longitudinally through the closure, at least as far outwardly as permitted by the spring when compressed to its limit, and as far inwardly as permitted by the detent head 20, which is arranged to engage the outer end of the closure and limit the movement of the disk in a direction away from the closure and to prevent the stem dropping from the closure when the parts are removed from the body 1. When the stem is forced outwardly against the tension of the spring until the spring has been compressed approximately to its limit, the inner end of the detent has passed outwardly beyond the closure, and the detent can then be swung laterally by its head to project one corner of the lower end 21, of the detent beyond the stem and above the top end of the closure. The spring can then be released and said projecting corner of the detent will engage the outer or top end of the closure and lock the stem against inward movement and the spring compressed. The stem and spring can be released by pressing the upper end of the detent laterally to swing the same back into normal position within the stem, releasing the lower end of the detent from locking engagement with the closure, whereupon the spring is released and free to force the disk and stem inwardly.

The chamber 8, is adapted to be filled with lubricating grease, the closure having been removed carrying the disk and spring with it. When the chamber has been charged with the required quantity of grease, the closure is applied to the chamber and screwed thereinto to chamber-closing position. When the closure is thus applied to the chamber, the disk is held at its limit of movement toward the closure with the spring compressed, by the detent which is in locking position. After the closure has been screwed into the chamber to closing position, the detent is swung to normal position releasing the disk and spring, and thereupon the spring drives the disk inwardly to exert the necessary pressure on the grease to feed the grease through the duct to the bearing surface. The pressure of the disk on the grease is sufficient to drive the grease at the required speed through the duct to supply the necessary lubrication of the bearing surface.

The lengths of the stem and spring are preferably sufficient to permit inward movement of the disk approximately to the inner end of the chamber, while the inward movement of the disk is limited by the engagement of the detent head with the outer end of the closure. Whenever the lubricant chamber needs refilling with grease, the closure is removed, carrying the stem, spring and disk from the chamber.

By providing the compression or force feed mechanism, I am enabled to employ heavy or comparatively thick lubricant such as what is commonly known as grease, which is far more economical and satisfactory for the purpose of my invention than oil, and I also attain advantages and economy by forming the lubricant chamber directly in the movable body having the bearing surface whether such body be rotatable, slidable, reciprocatory or even immovable or has a cylindrical, flat, or other bearing surface to be lubricated.

It is evident that various changes, variations, and modifications might be resorted to in the parts, constructions, arrangements and combinations described without departing from the spirit and scope of my invention, and hence I do not wish to limit myself to the exact disclosure hereof.

What I claim is;—

1. A body provided with a compression chamber having a grease offtake duct leading therefrom, a removable plug for normally closing the outer end of said chamber, a grease compressing disk movable longitudinally in said chamber for compressing the grease therein and provided with a spring for actuating the same, a stem carrying said disk and extending through and movable longitudinally in said plug and provided with and carrying a swingable detent to engage the plug to hold said spring compressed and having a T shaped head to limit the inward movement of the disk under the pressure of said spring.

2. A closure for a grease chamber, a grease compressing disk having a stem extending through and movable longitudinally in the closure, an expansion spring between the disk and closure for driving the disk on its grease compressing stroke, and a detent carried by the stem and pivotally mounted thereon to swing laterally and project its inner end to engage the closure and hold the disk at its limit of movement toward the closure and at its outer end having a projecting head to engage the closure and limit the movement of the disk away from the closure.

3. A closure for a grease chamber having a longitudinal bore, a grease compressing disk having a stem extending through and movable in said bore, said stem being longitudinally slotted, an elongated detent arranged in said slot and between its ends pivoted to the stem to swing laterally to and from its normal position arranged longitudinally of and within the stem, said closure having a socket at its inner end, and a coiled expansion spring arranged between the disk and closure with its outer end located within said socket.

4. In combination, a closure for a lubricant chamber, a lubricant compressing member having a stem extending through and projecting beyond said closure and normally freely movable longitudinally of said closure, a spring for driving said member on its lubricant compressing movement, and a detent carried by and normally arranged within said stem to move therewith through said closure on the normal operation of said member, said detent being laterally movable with respect to said stem and from said normal position to engage the outer end of the closure to hold the stem approximately at its limit of outward movement through the closure, substantially as described.

5. In combination, a closure for a lubricant chamber, said closure having a longitudinal passage therethrough, a lubricant compressing member provided with a stem extending through said passage and slidably arranged therein, a spring interposed between said member and the closure for forcing the member inwardly on its compressing movement, and a detent carried by and pivoted in said stem and normally arranged longitudinally thereof to move with the stem through said passage, said detent having a free inner end, said detent arranged to be moved from normal position to project said end laterally beyond the stem to engage the closure and hold the member approximately at its limit of outward movement.

6. A body having a lubricant chamber with an off-bearing duct opening through its inner end, said chamber having an opening, a removable closure normally closing said opening, and means for varying the capacity of said duct, said means being arranged at the inner end of said chamber and accessible for adjustment from within said chamber only when the closure is removed therefrom, said means comprising a member rotatable to partially close or completely open said duct and having an operating portion exposed in said chamber and formed to receive an implement for rotating said member inserted into said chamber through said opening thereof.

7. A body having a lubricant chamber with an off-bearing duct opening through the floor of said chamber, said chamber having a filling opening, a removable closure for said filling opening, and a rotary member on the floor of said duct and arranged to rotate on an axis to one side of and approximately parallel with the axis of said duct, said member being rotatable to project more or less across said duct to vary the capacity thereof, said member being accessible within the chamber for adjustment.

8. A movable body having a central bore, a pair of approximately-similar bearing bushings removably inserted into said bore from opposite ends thereof, the inner adjacent ends of bushings being spaced a distance apart to form an annular intervening lubricant distributing chamber, said body formed with a lubricant supply chamber opening to the exterior of the body and discharging into said distributing chamber, substantially as described.

In testimony whereof I affix my signature in presence of two witnesses.

MARVIN A. NICOL.

Witnesses:
E. G. SMELSER,
N. L. ATKINS.